United States Patent [19]

Ugelstad

[11] 4,336,173

[45] Jun. 22, 1982

[54] PROCESS FOR PREPARING AN AQUEOUS EMULSION OR DISPERSION OF A PARTLY WATER-SOLUBLE MATERIAL, AND OPTIONALLY FURTHER CONVERSION OF THE PREPARED DISPERSION OR EMULSION TO A POLYMER DISPERSION WHEN THE PARTLY WATER-SOLUBLE MATERIAL IS A POLYMERIZABLE MONOMER

[75] Inventor: John Ugelstad, Trondheim, Norway

[73] Assignee: SINTEF, Norway

[21] Appl. No.: 186,008

[22] Filed: Sep. 10, 1980

Related U.S. Application Data

[63] Continuation of Ser. No. 10,989, Feb. 8, 1979, abandoned.

[30] Foreign Application Priority Data

Feb. 21, 1978 [NO] Norway .................................. 780596
Aug. 28, 1978 [NO] Norway .................................. 782920

[51] Int. Cl.$^3$ .............................................. C08L 25/06
[52] U.S. Cl. ......................... 523/205; 260/29.6 RW; 260/29.6 MH; 260/29.6 PT; 524/458; 524/465; 524/577; 524/314; 524/794; 524/836; 524/560; 523/221
[58] Field of Search ................. 260/29.6 R, 29.6 RW, 260/29.6 MH, 29.6 WB, 29.6 PT, 29.7 R, 29.7 DP, 29.7 UP, 29.7 W, 29.7 GP

[56] References Cited

U.S. PATENT DOCUMENTS

| | | | |
|---|---|---|---|
| 2,467,352 | 4/1949 | Williams | 260/29.6 R |
| 2,538,273 | 1/1951 | Rhines | 260/29.7 R |
| 3,669,728 | 6/1972 | Seiner | 260/29.6 R |
| 3,669,729 | 6/1972 | Seiner | 260/29.6 R |
| 4,011,388 | 3/1977 | Murphy | 526/201 |
| 4,094,841 | 6/1978 | Mani | 260/29.6 H |
| 4,113,687 | 9/1978 | Ugelstad | 260/29.7 R |
| 4,152,496 | 5/1979 | Barrett | 260/29.7 DP |
| 4,247,434 | 1/1981 | Lovelace | 260/29.6 RB |

OTHER PUBLICATIONS

Dale M. Kornfeld, "Large-size Monodisperse Latexes as a Commercial Space Product", NASA, Aug. 1977.

*Primary Examiner*—Paul R. Michl
*Attorney, Agent, or Firm*—Wenderoth, Lind & Ponack

[57] ABSTRACT

The invention provides a process for preparing an aqueous emulsion or dispersion of a partly water-soluble material, and optionally further conversion of the prepared dispersion or emulsion to a polymer dispersion when the partly water-soluble material is a polymerizable monomer. In a first step a dispersion of polymer particles is prepared containing one or more materials having a very low solubility in water, then in a second step there is added the partly water-soluble material which diffuses into the particles from the first step, and then, if the partly water-soluble material is a polymerizable monomer, polymerization may be effected.

32 Claims, No Drawings

PROCESS FOR PREPARING AN AQUEOUS EMULSION OR DISPERSION OF A PARTLY WATER-SOLUBLE MATERIAL, AND OPTIONALLY FURTHER CONVERSION OF THE PREPARED DISPERSION OR EMULSION TO A POLYMER DISPERSION WHEN THE PARTLY WATER-SOLUBLE MATERIAL IS A POLYMERIZABLE MONOMER

This is a continuation of application Ser. No. 10,989 filed Feb. 8, 1979 now abandoned.

The present invention relates to a process for preparing aqueous emulsions or dispersions of a partly water-soluble material or mixtures of partly water-soluble materials, and possibly further polymerisation when the partly water-soluble material is a monomer or a mixture containing one or more monomers.

In Norwegian patent application Ser. No. 76.0554, which discloses a process for preparing emulsions of somewhat water-soluble vinyl monomers, it has been demonstrated that it is possible to prepare stable emulsions of vinyl monomer by preparing in a first step an aqueous pre-emulsion of a material having a very low solubility in water, by an efficient homogenisation process, and then upon addition of water and emulsifier allowing the somewhat water-soluble vinyl monomer to diffuse into the droplets of the material having a very low solubility in water. The fact that the droplets in the pre-emulsion consisted of a material which combined very low water solubility and low molecular weight, had the effect that the droplets could absorb 50-500 times their own volume of the somewhat water-soluble vinyl monomer, with formation of stable dispersions which were subjected to polymerisation to form a latex. The pre-emulsion was in this case prepared by homogenisation, which leads to a broad distribution of the droplet size which became even broader after absorption of the vinyl monomer.

In Norwegian patent application 76.3984 there is disclosed the preparation of a dispersion of particles by ordinary emulsion polymerisation, but in contrast to ordinary polymer latexes, the particles contain a substantial fraction of oligomers having a much lower molecular weight. As a consequence of this the particles may take up 20-200 times their own volume of a somewhat water-soluble substance. In order to attain the formation of oligomers having low molecular weight by ordinary emulsion polymerisation there is used according to patent application 76.3984 an addition of chain transfer agent during the polymerisation, which causes the formation of shorter chains.

Both in the process described in patent application Ser. No. 76.0554 and in patent application Ser. No. 76.3984, there is obtained in a first step a pre-emulsion of particles which have the ability to take up a somewhat water-soluble material in an amount of 10-200 times more than corresponding polymer particles.

By the method described in patent application Ser. No. 76.3984 one avoids the homogenisation of the substance having a very low solubility in water and having a low molecular weight, which is described in patent application Ser. No. 76.0554. Further, the method disclosed in patent application Ser. No. 76.3984 provides greater possibilities for the preparation of more monodisperse droplets or particles with a predetermined size. A disadvantage of the method described in patent application Ser. No. 76.3984, is however that the chain transfer agent which usually will be a mercaptan compound, is a badly smelling, partly toxic compound with which it is unpleasant to work. Further, addition thereof will often result in a reduction of the rate of polymerisation. It may also require that the chain transfer agent is added in portions or continuously during the polymerisation in order not to obtain a too broad distribution of molecular weight and a too high proportion of highly polymeric material.

According to the present invention there are prepared aqueous dispersions of particles which in addition to polymer molecules contain a considerable proportion of one or more low molecular weight material(s) having a very low solubility in water, in the following called Substance I, and which therefore have a much greater ability than particles of pure polymer, to take up a partly water-soluble substance, in the following called Substance II, added in the next step.

In patent application Ser. No. 76.3984 particles containing 10-100% water-insoluble oligomer are prepared by adding a chain transfer agent during the polymerisation of the monomer on which the particles are based.

According to the present invention Substance I as such is introduced into the particles. This takes place during or after the formation of the polymer particles by emulsion polymerisation by making it possible for Substance I to diffuse through the aqueous phase and to become absorbed in the particles. Substance I may also be incorporated directly in the polymer particles by preparing an aqueous emulsion of a mixture of Substance I and a monomer by homogenisation and then polymerising the monomer, for instance a vinyl monomer, to obtain polymer particles containing Substance I. The common feature of the two processes is that in the first step there is prepared an aqueous dispersion of particles or droplets which in addition to polymer contains a relatively low molecular weight water-insoluble Substance I, and that these particles, as mentioned above, will be able to absorb a very large amount of a partly water-soluble Substance II which under the conditions given may diffuse through the aqueous phase and be taken up in the particles consisting of polymer and Substance I.

By having prepared in the first step particles which in addition to polymer also contain Substance I, there have been formed particles which are capable of taking up the partly water-soluble Substance II which may diffuse through the aqueous phase to the particles and become absorbed therein. In the second step one may then attain a ratio by volume between Substance II and particles which is 5-100 times higher than with particles of pure polymer. The Substance II used may be any partly water-soluble substance which is capable of diffusing through the aqueous phase. It may for instance also be a monomer or a mixture of a monomer and another Substance II.

In case Substance II added in the second step comprises a monomer, it may be polymerized after absorption in the particles. The present process represents in this case a specific type of seed technique.

The first method in which Substance I is incorporated in the first step in polymer particles prepared by ordinary emulsion polymerisation is particularly suitable when it is desired to prepare dispersions having a predetermined particle or droplet size and size distribution, including monodisperse droplets or particles and polydisperse systems with a very even size within the individual fractions. Monodisperse emulsions are very difficult to prepare by ordinary emulsion processes. Similarly, it is very difficult to prepare directly monodisperse polymer dispersions having a particle diameter above 1 μm. For several purposes it is desirable to prepare larger particles having a uniform particle size, for instance as standard for microscopy, as model systems for separation, fluid flow, centrifugation, diffusivity measurement and dust investigations. Further, the particles may be used in electro kinetic studies and also within photography, for instance as a coating layer in X-ray film. They may also be used within biomedicine as a means for diagnosis and detection of antigens and antibodies in biological fluids. Similarly, it may also be desirable to have a predetermined size and size distribution in dispersions of active substances having for instance biochemical effect, such as pesticides. Further, for certain paint dispersions a predetermined particle size distribution is desirable. This is also the case with PVC-dispersions. Monodisperse particles may also be used as flattening agent for paint and powder paint. They may also be used as toners, for example in xerography. Further, the particles in dry form may be used for tribological purposes. By using as Substance II a mixture of a partly water-soluble solvent, a vinyl monomer and a divinyl monomer, one may after swelling polymerize and strip off the solvent in a per se known manner to obtain porous particles which are suitable for separation purposes. By using as Substance II a monomer or a monomer mixture and a low boiling substance, the present process may be used for the preparation of expanding microspheres. Large monodisperse particles may also be used for the preparation of material for ion chromatography wherein it is preferred that the particles are monodisperse to attain minimum pressure drop in the column.

According to the invention for the above purposes one may prepare an aqueous dispersion of polymer particles by ordinary emulsion polymerisation and then with a specific treatment of those particles, increase their ability to take up the somewhat water-soluble material, Substance II. By preparing polymer particles according to general principles it is possible to adjust the size and the size distribution of the particles within wide limits. In the subsequent addition of the partly water-soluble material, dispersion of this material will then be obtained with a droplet size which is completely determined by the size of the premade polymer particles and the amount of Substance II absorbed in the particles. According to the present invention it is possible to absorb in the premade polymer particles up to 800 times the volume of the polymer particles of the partly water-soluble materials by this two step swelling process.

In a preferred embodiment of the process according to the invention the polymer particles are swelled in the first step with the material having a very low solubility in water, Substance I. Substance I has a molecular weight of $<5000$, preferably $<500$, and a water solubility of $<10^{-2}$, normally $<10^{-4}$, preferably $<10^{-5}$ g/l of $H_2O$. In order to attain a transportation of Substance I having a very low solubility in water through the aqueous phase and into the particles, it is necessary to carry out the first step under conditions which facilitate this transfer of Substance I. The transfer may be facilitated in several ways. One may prepare a finely divided aqueous emulsion of Substance I which is added to the dispersion of polymer particles. This distribution will facilitate the transfer by increasing the boundary surface towards water. This fine distribution of Substance I may be provided by using relatively large amounts of emulsifier or mixtures of emulsifiers which will result directly in finely divided emulsions, possibly microemulsions, or in specific cases, mixed micelles and/or by using intensive homogenisation of Substance I, water and emulsifier.

The first step may optionally comprise that the swelling of the polymer particles in the first step with Substance I takes place continuously during the preparation of the polymer particles. This may be done by allowing Substance I to be present during the preparation of the polymer. It is then preferably mixed with the monomer or the monomer mixture from which the polymer is prepared, and in addition initiator is used. In order for Substance I to diffuse into the polymer particles as they are formed, the polymerisation is carried out under conditions which allow transport of Substance I through the aqueous phase.

A method which to a great extent will facilitate the transfer of Substance I to the particles, comprises that in the first step there is added a certain amount of a material which is a solvent for Substance I and at the same time is completely or partly soluble in water. This will increase the rate of transfer of Substance I to the particles by increasing the solubility in the aqueous phase. Examples of such solvents are acetone and lower alkanols. Normally said solvents are used in an amount of 1–100 percent of the amount of water, based on volume.

In case the monomer or one of the monomers in a mixture of monomers used for the preparation of polymer particles into which Substance I is to be introduced, is relatively water-soluble, the monomer itself may serve as such a solvent. Examples of such relatively water-soluble monomers are vinyl acetate, acrylic acid, acrylonitrile, methyl acrylate and acrylic amide which then in a subsequent step are polymerized.

Advantageously it is also possible to employ a conbination of the above methods which will comprise the preparation of Substance I in a finely dispersed form and the use of an excess of emulsifier or addition of a solvent miscible with water in the first step.

In those cases in which the glass transition temperature, Tg, of the polymer particles is above the temperature at which Substance I is introduced, the diffusion of Substance I into the polymer particles may be rate determining. In this case it may be advantageous to have present a small amount of a substance which will lower the Tg of the particles before introducing Substance I. This may for instance be accomplished by letting the original polymer particles contain a substantial amount of unreacted monomer or during the preparation of the original polymer particles to have present a substance which is sufficiently water-soluble to diffuse into the polymer particles as they are formed. Also this substance may be absorbed in premade polymer particles. The only purpose of this substance is to lower Tg and thereby facilitate transport of Substance I into the particles.

The transfer of Substance I to the polymer particles in the first step, som that they become swelled with Substance I, may be accomplished in several ways. Polymer particles are accordingly obtained containing Substance I in an amount of up to 10, normally 0.05–5, particularly 1–4 times the amount of the polymer, based on volume. An essential feature of the present process is that before adding the somewhat water-soluble Substance II which is to diffuse into the polymer particles in the second step, the conditions are changed so that while Substance II may diffuse through the aqueous phase into the polymer particles, the transport of Substance I through the aqueous phase in this second step of the process is effectively inhibited so that no Substance I may diffuse out of the polymer particles. Particles which are swelled with Substance I may be capable of taking up up to 1000, normally up to 800, particularly 20–300 times their original volume of Substance II. The strong reduction of transport of Substance I from the particles before Substance II is added, which is a necessary condition for the method to work, will partly be attained directly when water is added before addition of Substance II. As particles containing Substance I should be charged with up to 800 times their original volume of Substance II, it will be necessary to dilute with water, according to the desired concentration in the final dispersion. Thus, if a dispersion is desired in which the ratio between water and Substance II is 1:1, water is added in step 2 in such an amount that the total amount of water will be the same as the amount of Substance II added in step 2. Normally the ratio between water and Substance II in the final dispersion will be from 80:20 to 20:80. Before addition of this amount of water there is present a relatively high concentration of those materials which have been added to facilitate the transport of Substance I to the particles. By addition of the large amount of $H_2O$ in the second step, the concentration of said materials will be strongly reduced, and thereby the possibility of transport of Substance I out of the particles will be considerably reduced. By using for instance acetone to promote a more readily transport of Substance I to the particles in the first step, it is advantageous to evaporate it off before adding water and Substance II in the second step. It is an essential feature of the present invention for the preparation of the dispersion of Substance II, that addition of Substance I and Substance II takes place in two steps so that Substance I is absorbed in the particles in a first step with conditions enabling transport of Substance I, while Substance II diffuses into the particles under conditions which inhibit the transport of Substance I through the aqueous phase. Thus, it will be found that if Substance I and Substance II are first mixed and this mixture is then added to an aqueous dispersion of the polymer particles, and by addition of for instance acetone, it is made possible for both Substance I and Substance II to be transported through the aqueous phase to the particles, then both Substance I and Substance II will be taken up, but the total amount absorbed will be limted to 1–4 times the volume of the particles.

When the ratio between water and Substance II is less than 50:50 it may be advantageous to add Substance II in portions or continuously over a certain period.

As Substance I there may be used any material or mixture of materials which exhibit the given properties, very low water-solubility and relatively low molecular weight. It is further an advantage that they are non-crystalline at the temperature at which they are incorporated into the particles. It is also an advantage that Substance I is in a liquid form at the temperature at which Substance II is introduced into the particles in the second step, since in this case there will not only be attained the above mentioned strongly increased capacity to absorb Substance II, but also often a very strong increase in the rate of absorption. This is in particular the case when working with a polymer in the initial particles for which the glass transition temperature is above the temperature employed during the swelling with Substance II.

If Substance II is a vinyl monomer which is to be polymerized after having diffused into the particles containing Substance I, it may be advantageous to use as Substance I, wholly or in part, a water-insoluble vinyl monomer which may be co-polymerized with the vinyl monomer added in the second step. Examples of vinyl monomers which satisfy the above requirements with respect to Substance I, are stearyl vinyl ether and stearyl methacrylate.

When the partly water-soluble Substance II wholly or in part is a monomer which after diffusion into the particles polymerizes to a polymer, the present invention represents as mentioned above, a type of seed technique which has often been described in the literature in connection with the preparation of latexes. With an ordinary seed process a latex is prepared by a common emulsion polymerisation, and this latex is used as seed. Monomer, water, emulsifier and initiator are added to this seed, and the polymerisation is performed. A latex will then be formed having larger particles than in the original seed latex. Means are provided to ensure that the polymerisation takes place inside the seed particles to avoid new formation of particles in the aqueous phase. The weakness of the conventional seed method is that the seed particles which consist of polymer molecules as described above are capable of absorbing only 1–4 times their own volume. If it is desired to prepare 500 g of latex particles from for instance 10 g of seed particles, this must be made in several steps with stepwise addition of emulsifier. The 10 g of seed particles will absorb only up to 40 g of monomer. This will result only in a small increase in the surface, and since it is not desired to have too much emulsifier in the aqueous phase, the amount of emulsifier must be limited to an amount which becomes adsorbed on the surface of the swelled seed particles. After polymerisation additional monomer and emulsifier are added, and the process is repeated. It will be obvious that this will require several steps before 500 g of latex particles have been formed.

By using, as according to the present invention, a seed consisting of polymer + Substance I, the seed particles will be capable of absorbing much greater amounts of monomer, it often being possible to add all monomer in one step, and the amount of seed employed may be greatly reduced. In the preparation of very large particles it may be necessary to repeat the process of swelling with monomer, possibly also with Substance I and initiator. In any case the number of steps will be greatly reduced in comparison with the number of steps necessary for the preparation of particles of the same size by using a common seed process. Further, the swelling of the particles with the large amount of monomer has the effect that a very large increase in the surface is attained. A consequence of this is that even if all emulsifier is added initially, it will to a very high extent become adsorbed on the surface of the swelled particles, and there will be very little emulsifier left in the aqueous phase, and therefore the formation of new particles in the aqueous phase will not take place.

As initiator for polymerisation, water-soluble initiators such as $K_2S_2O_8$ or $H_2O_2$ may be used. They are preferably added after swelling with monomer. An oil-soluble initiator may also be used. When using an oil-soluble initiator which is somewhat soluble in water, such as azobisisobutyric nitrile (AIBN), this may be added after the monomer has diffused into the particles or it may be dissolved in the monomer before the latter diffuses into the particles. When using oil-soluble initiators which are less water-soluble, such as lauroyl peroxide, it will be necessary to add this together with Substance I as the conditions are then, as described above, such that even substances having a very low solubility in water may be transported through the aqueous phase.

Initiators which possess the combination of low solubility in water and low molecular weight may also act as Substance I. It has been found that certain specific initiators which are liquid at the temperatures in question are particularly favourable as Substance I. They may easily be incorporated in the particles according to the methods described above. This will in particular be of interest when Substance II is a monomer, as such initiators act as Substance I, and further, they will act as initiator for the polymerisation of Substance II. An example of such an initiator is dioctanoyl peroxide.

Oil-soluble initiators which have a very low solubility in water, such as dioctanoyl peroxide, have the advantage in comparison with more water-soluble initiators such as AIBN, that they not only reduce the risk of formation of new particles in the aqueous phase, but they also reduce the risk of bulk polymerisation. With the latter oil-soluble, but also somewhat water-soluble, initiator, it is an absolute requirement that all monomer has been absorbed in the particles before the polymerisation is started by raising the temperature. Similarly, with this initiator care must be taken so that no monomer phase is formed by evaporation and condensation of monomer during the polymerisation. Oil-soluble initiators such as AIBN are sufficiently water-soluble to diffuse into the possible monomer phase and start a bulk polymerisation which will result in the formation of large lumps and thereby entail great disadvantages. By using an initiator having a very low solubility in water, such as dioctanoyl peroxide, the possibility of all monomer added in the second step not being absorbed, will not be of the same importance since the initiator has such a low water-solubility that it will not diffuse out of the particles through the aqueous phase to the possible monomer phase. Thus, if a certain monomer phase is intermediately present during the polymerisation, the only thing which may possibly happen is a thermal polymerisation therein, and monomer will primarily be absorbed in the particles containing the initiator as the polymerisation proceeds.

With such an oil-soluble initiator having a very low solubility in water one may therefore, if desired, even swell and polymerize in several steps at the polymerisation temperature without having to reduce the temperature before each swelling process with monomer, to prevent bulk polymerisation. Similarly, for the same reason it is possible to add vinyl monomer continuously during the polymerisation. Even in these cases it is an advantage that Substance I (which in this case is initiator) is liquid at the temperature in question, so that the rate at which the monomer is absorbed in the particles increases. The use of dioctanoyl peroxide or other greatly water-insoluble initiators alone or together with another Substance I which is not initiator has been found very suitable for the preparation of monodisperse particles having a large particle size.

For the preparation of large monodisperse particles according to the present invention one starts with a seed having relatively small monodisperse polymer particles which are charged with Substance I as described above and then with monomer which is then polymerized.

The starting seed is prepared by ordinary emulsion polymerisation under conditions which yield monodisperse particles. Such methods are well known in the literature, see for instance Woods, M. E., Dodge, J. S. and Krieger, I. M., J. Paint Techn. 40, 541 (1968).

These methods, which all are variations of ordinary emulsion polymerisation, are satisfactory for the preparation of monodisperse particles having a diameter up to approx. 0.5 $\mu$m. Monodisperse particles having a diameter above 1 $\mu$m are difficult to prepare by these methods, and monodisperse particles above 2 $\mu$m cannot be prepared by ordinary emulsion polymerisation.

By the process according to the present invention it has been found possible to prepare monodisperse particles with a very low standard deviation having a diameter $\geq 5$ $\mu$m.

The preferred embodiment described above for the preparation of particles containing Substance I is particularly favourable if it is desired to obtain a monodisperse dispersion or a polydisperse dispersion having even particle or droplet sizes within the individual fractions. In some cases this will not be necessary or desirable, and it may be satisfactory or even desirable to obtain a broad distribution of particle size. In this case the other method mentioned above may be used. This is the method which comprises mixing of monomer, Substance I and possibly oil-soluble initiator and then preparing a dispersion of these materials by mixing with water and emulsifier and homogenisation of this mixture with a homogenizer. Due to the presence of Substance I the dispersion prepared will be stable against degradation due to diffusion, as described in our application 76.0554.

After the homogenisation the monomer is polymerized. This may be accomplished by adding a water-soluble initiator or an oil-soluble, partly water-soluble initiator which diffuses through the aqueous phase into the particles. If an oil-soluble initiator has been present during the homogenisation, the monomer is polymerized by heating after homogenisation. Thereby a dispersion of particles containing 5-90 percent of Substance I is prepared. These particles do not differ in principle from the particles described above wherein Substance I is incorporated in the preformed polymer particles or are present during the preparation.

The essential common feature of the two methods described above, is that in both cases particles are prepared in a first step which in addition to polymer contain an essential proportion of the relatively low molecular weight Substance I having a low solubility in water, which provides particles having a greatly increased capacity of absorption and results in increased rate of absorption. The particles prepared by the latter method are swelled in the next step with Substance II in the same manner and with the same result as the particles prepared according to the former process. Even with the latter particles Substance II may be a monomer which after absorption is polymerized either by means of the initiator already present in the particles and/or by means of additional initiator or additives which increase the rate of formation of radicals in the particles. The advantages of this seed method in comparison with ordinary seed methods is of course the same as described above and are as follows:

The presence of Substance I in the seed particles entails an enormous increase in the ability of the seed particles to be swelled with monomer. Thereby, the amount of seed used may be reduced. Further, the increased extent of swelling will result in a very large increase of the surface of the particles. Thereby the capacity to adsorb the emulsifier increases, so that all emulsifier may be added initially without any risk of having so much emulsifier present in the aqueous phase that formation of new particles takes place therein. In ordinary seed polymerisation the emulsifier must be added continuously or stepwise to avoid formation of new particles in the aqueous phase.

Since it is possible to use such small amounts of seed, it may be without importance for the properties of the final polymer dispersion which monomer is used in the first step, and it is accordingly possible to use a monomer in the first step which is different from that added in the second step.

The present invention may be used for the preparation of dispersions of any partly water-soluble material and mixtures of such which are capable of diffusing through the aqueous phase, which will require that Substance II has a water-solubility of $>10^{-4}$ g/l $H_2O$, preferably $>10^{-3}$ g/l $H_2O$. The ratio between the solubility of Substance I and Substance II is of essential importance. Thus, Substance II should be at least 10 times, preferably at least 100 times as water-soluble as Substance I. Thus, when Substance I has a water-solubility of $10^{-4}$ g/l $H_2O$, Substance II should preferably have a water-solubility of above $10^{-2}$ g/l $H_2O$. On the other hand, if it is desired to prepare a dispersion of a Substance II with a water-solubility of $10^{-4}$ g/l $H_2O$, there should be used a Substance I having a water-solubility of preferably less than $10^{-6}$ g/l $H_2O$.

It has been found that even relatively small amounts of Substance I in the polymer particles will provide a considerable increase in the ability of the particles to absorb Substance II compared with particles of pure polymer in the case of relatively large particles. Such a system with large particles containing relatively little of Substance I, in addition to being obtainable from pure polymer dispersions, will be present after a process with swelling of particles having a relatively high content of Substance I with monomer which is then polymerized as described above. Particles have then been obtained which are much larger than the original particles, which means that the amount of polymer has greatly increased while the amount of Substance I is the same as before the process with swelling and polymerisation. It has been found that even with an amount of about 5 percent of Substance I, based on polymer, particles having a diameter of about 2 $\mu$m are capable of absorbing an amount of Substance II which is about 40 times higher than the amount of polymer particles, based on volume.

EXAMPLE 1

77 ml of $H_2O$, 13.5 ml of 1-chlorododecane and 0.2 g of Na-laurylsulphate (NaLS) were homogenized in a two-stage Manton Gaulin homogenizer, model 15 M with 200 kg/cm$^2$ in the 1st stage and 80 kg/cm$^2$ in the 2nd stage for 1–1.5 min. This resulted in an emulsion having a droplet diameter of about 0.1–0.2 $\mu$m. This emulsion was charged with seed latex of monodisperse polystyrene having a particle diameter of 0.65 $\mu$m (determined by electron microscopy). An amount of 83.8 ml of seed latex was used containing 77 ml of $H_2O$ and 6.8 ml of polystyrene particles. Further, 6 ml of $H_2O$ and 18 ml of acetone were added under ordinary stirring at 35°–40° C. After stirring for 10 hours at 40° C. acetone was removed by evaporation under vacuum.

The emulsion was examined in optical microscope, and it was found that a monodisperse emulsion having a droplet diameter of about 0.9 $\mu$m had been obtained. After evaporating the acetone 1.0 g of Na-lauryl sulphate and 840 ml of $H_2O$ were added, so that a total of 1000 ml of $H_2O$ were present. Then, 800 ml of chlorobenzene were added under ordinary stirring at 30° C. After stirring for 60 min. at 30° C. all chlorobenzene had diffused into the droplets. The emulsion was examined in optical microscope, and it was found that a monodisperse emulsion having a droplet diameter of about 3.0 $\mu$m had been formed.

EXAMPLE 2

The experiment was carried out as described in example 1, the only difference being that 35 ml of acetone were used. With this increase in the amount of acetone the stirring time for the introduction of 1-chlorododecane could be reduced to <5 hours.

EXAMPLE 3

Swelling of monodisperse polystyrene latex with chlorododecane was carried out as described in example 1. After evaporating the acetone 1.0 g of Na-laurylsulphate and 840 ml of $H_2O$ were added, to provide a total of 1000 ml $H_2O$. Then 800 ml of ethyl benzene were added at 30° C. under ordinary stirring. After 60 min. all ethyl benzene had diffused into the droplets. Examination in optical microscope indicated a monodisperse emulsion having a droplet diameter of about 3.0 $\mu$m.

EXAMPLE 4

350 ml of $H_2O$, 13.5 ml of 1-chlorododecane and 6 g of Berol 09 (nonyl phenol ethoxylate containing 10 moles of ethylene oxide per mole of nonyl phenol) were mixed in a high speed mixer of the type Ultraturrax for about 15–20 min. at 10,000 rpm. This yielded an emulsion having a droplet diameter of 0.2–0.5 $\mu$m. This emulsion was then added to the same type and amount of polystyrene seed latex as described in example 1. Then 47 ml of acetone were added under ordinary stirring at 35°–40° C. After stirring for 10 hours at 40° C. acetone was evaporated under vacuum. Examination in optical microscope indicated a monodisperse emulsion having a droplet diameter of 0.9 $\mu$m. After evaporation of acetone 1.0 g of Na-lauryl sulphate and 573 ml of $H_2O$ were added, giving a total of 1000 ml of $H_2O$. Then 800 ml of ethyl benzene were added under ordinary stirring at 30° C. After stirring for 60 min. at 30° C. all ethyl benzene had diffused into the droplets. Examination in optical microscope indicated a monodisperse emulsion having a droplet diameter of 3.0 $\mu$m.

EXAMPLE 5

75 ml of $H_2O$, 15 ml of dioctyl adipate and 0.75 g of Na-laurylsulphate were homogenized as described in example 1. This emulsion was added to a seed latex of bidisperse polyvinyl chloride having particle diameters of 0.2 and 0.8 $\mu$m (determined by electron microscopy). 24.3 ml of seed latex were used containing 16.8 ml of $H_2O$ and 7.5 ml of polymer particles. Further, 10 ml of acetone were added under ordinary stirring at 35°–40° C. After stirring for 10 hours at 40° C. acetone was removed by evaporation under vacuum. The emulsion was examined in optical microscope, and it was found that the result was a bidisperse emulsion having droplet diameters of about 0.25 and 1.1 $\mu$m. After evaporation of acetone 1.8 g of Na-laurylsulphate and 908.2 ml of H$_2$O were added, to provide a total of 1000 ml of H$_2$O. Further, 660 ml of dichloroethane were added at 30° C. under ordinary stirring. After stirring for 60 min. at 30° C. all dichloroethane had diffused into the droplets. The emulsion was examined in optical microscope, and it was found that a bidisperse emulsion had been obtained having a droplet diameter of 0.8 and 3.5 μm.

EXAMPLE 6

330 ml of H$_2$O, 10 ml of chlorododecane, 10.5 g of Berol 09 (nonyl-phenol ethoxylate containing 10 moles of ethylene oxide per mole of nonyl phenol) were mixed by means of a high speed mixer of the type Ultraturrax for about 15–20 min. at 10,000 rpm. This resulted in an emulsion having a droplet diameter of 0.2–0.5 μm. This emulsion was added to the same seed latex as described in example 1. An amount of 248.6 ml of seed latex was used containing 228.6 ml of H$_2$O+20 ml of polystyrene particles. After stirring for 15 hours at 40° C. 421.4 ml of H$_2$O, 2 g of NaLS and 800 ml of chlorobenzene were added. After stirring for 60 min. all chlorobenzene had diffused into the droplets. The emulsion was examined in optical microscope, and it was found that a monodisperse emulsion having a droplet diameter of 2.1 μm. had been formed.

EXAMPLE 7

77 ml of H$_2$O, 11.7 ml of chlorododecane, 1.8 g of benzoyl peroxide, 9.3 ml of dichloroethane and 0.2 g of Na-laurylsulphate were homogenized as described in example 1. This emulsion was added to the same type and the same amount of seed latex as described in example 1. Further, 6 ml of H$_2$O and 8.5 ml of acetone were added under ordinary stirring at 35°–40° C. After stirring for 12 hours at 40° C. acetone was removed by evaporation under vacuum. After evaporation of acetone and dichloroethane 1.0 g of Na-laurylsulphate and 840 ml of H$_2$O were added to provide a total of 1000 ml of H$_2$O. Further, 275 ml of distilled styrene were added under ordinary stirring at 30° C. After stirring for 2 hours at 30° C. the temperature was raised to 60° C. and the polymerisation started. After 25 hours polymerisation a monodisperse latex was obtained having a particle diameter of about 2 μm.

EXAMPLE 8

100 ml of H$_2$O, 20 ml of dioctyl adipate, 0.5 g of NaLS were homogenized as described in example 1. This emulsion was added to a seed latex of a bidisperse polyvinyl chloride having particle diameters of 0.1 and 0.3 μm (determined by electron microscopy). 45 ml of seed latex were employed containing 35 ml of H$_2$O and 10 ml of polymer particles. Then 15 ml of acetone were added under ordinary stirring at 40° C. After stirring for 10 hours at 40° C. the acetone was removed by evaporation under vacuum. After evaporation of acetone 2.0 g of NaLS and 865 ml of H$_2$O were added to provide a total of 1000 ml H$_2$O. Further, 600 ml of vinyl chloride were added under ordinary stirring at 30° C. After stirring for 2 hours at 30° C. all vinyl chloride had diffused into the droplets, and 3.0 g of AIBN dissolved in 10 ml of dichloroethane were added. After stirring for 1 hour at 30° C. the temperature was raised to 50° C. for polymerisation. The final latex was bidisperse and contained particles having diameters 0.3 and 1.0 μm.

EXAMPLE 9

150 ml of H$_2$O, 30 ml of dioctyl adipate, 0.75 g of Na-laurylsulphate were homogenized as described in example 1. This emulsion was added to a seed latex of polyvinyl chloride having particles evenly distributed from 0.1 to 0.3 μm. 60 ml of seed latex containing 45 ml of H$_2$O and 15 ml of particles were employed. Then 20 ml of acetone were added under ordinary stirring at 40° C. After stirring for 10 hours at 40° C. acetone was removed by evaporation under vacuum. After evaporation of acetone 2.25 g of Na-laurylsulphate and 745 ml of H$_2$O were added. Further, 800 ml of vinyl chloride were added. After stirring for 2 hours at 50° C. 2.0 g of K$_2$S$_2$O$_8$ dissolved in 60 ml of H$_2$O were added, and polymerisation was carried out. The final latex contained particles having diameters from 0.3–1.0 μm.

EXAMPLE 10

Monodisperse latex of polystyrene having a particle diameter of 2.1 μm was prepared as described in example 7. To 125.6 ml of this latex containing 100 ml of H$_2$O and 25.6 ml of particles comprising 1.2 ml of chlorododecane were added 3.0 g of Na-laurylsulphate and 900 ml of H$_2$O to provide a total of 1000 ml of H$_2$O. Further, 900 ml of chlorobenzene were added under ordinary stirring at 30° C. After stirring for 2 hours at 30° C. all chlorobenzene had diffused into the droplets. The emulsion was examined in optical microscope, and it was found that a monodisperse emulsion had been formed having a droplet diameter of about 6.5 μm.

EXAMPLE 11

120 ml of styrene and 100 ml of chlorododecane were mixed and added to 1000 ml of H$_2$O, 200 ml of methanol and 0.6 g of K$_2$S$_2$O$_8$, and the entire mixture was then polymerized at 60° C. for 8 hours. The latex formed was monodisperse having a particle diameter of 0.75 μm and with particles consisting of polystyrene and chlorododecane in the ratio 1:1. 180 ml of the seed latex formed, consisting of 150 ml of H$_2$O and 15 ml of polymer particles swelled with 15 ml of chlorododecane were added to 850 ml of H$_2$O, 2.0 g of NaLS and 800 ml of chlorobenzene with ordinary stirring at 30° C. After stirring for 6 min. at 30° C. all the chlorobenzene had diffused into the particles. The emulsion was examined in optical microscope, and it was found that a monodisperse emulsion having a droplet diameter of 2.25 μm had been formed.

EXAMPLE 12

100 ml of H$_2$O, 9 ml of 1-chlorododecane and 5 g of NaLS were homogenized in a two stage Manton Gaulin homogenizer with 200 kg/cm$^2$ in the 1st stage and 80 kg/cm$^2$ in the 2nd stage for 1–1.5 min. This resulted in an emulsion having a droplet diameter of 0.1–0.2 μm. To this emulsion there was added a seed latex of monodisperse polybutyl acrylate having a particle diameter of 0.3 μm (determined by electron microscopy). 109 ml of seed latex were used containing 100 ml of H$_2$O and 9 ml of polymer particles. Further, 20 ml of acetone were added under ordinary stirring at 35°–40° C. After stirring for 3 hours at 35° C. acetone was removed by evaporation under vacuum. (It should be noted that the stirring time for incorporating the 1-chlorododecane has been strongly reduced since a polymer having a much lower glass transition temperature than polystyrene was used.)

After evaporating the acetone 800 ml of H$_2$O were added to provide a total of 1000 ml of H$_2$O. Then 800 ml of chlorobenzene were added at 30° C. After stirring for 2 hours all chlorobenzene had diffused into the droplets, and examination in optical microscope indicated a monodisperse emulsion having a droplet diameter of about 1.4 μm.

EXAMPLE 13

Seed latex of monodisperse polystyrene having a particle diameter of 0.5 μm (determined by electron microscopy) was swelled with a slightly water soluble compound, in this case toluene. This was done to decrease the glass transition temperature of the particles and then facilitate the transport of Substance I within the particles. An amount of 99 ml of seed latex was used containing 91 ml of H$_2$O and 8 ml of polystyrene particles. To this latex was added 0.05 g Na-laurylsulphate and 8 ml toluene under ordinary stirring at 35° C. After the absorption of toluene in the particles had taken place, the swelling with Substance I was carried out. 80 ml of H$_2$O, 8 ml of 1-chlorododecane and 0.2 g of Na-laurylsulphate were homogenized as described in example 1. This emulsion of Substance I was then added to the seed latex previously swollen with toluene as described above. 10 ml of acetone was added and the mixture stirred at 35° C. By this method the time for complete absorption of Substance I into the particles was considerably reduced and was completed in less than 2 hours. After removal of acetone by evaporation, 829 ml of H$_2$O, 2.75 g of Na-laurylsulphate and 800 ml of chlorobenzene werre added, and the stirring continued at 35° C. After stirring for 60 min. all chlorobenzene had diffused into the particles. The emulsion was examined in optical microscope and it was found that a monodisperse emulsion having a droplet diameter of 2.3 μm had been formed.

EXAMPLE 14

50 ml of H$_2$O, 5 ml of Perkadox SE 8 (dioctanoyl peroxide) and 1.5 g of NaLS were homogenized. Perkadox SE 8 is an initiator having a melting point of 19° C., and due to the low solubility in water it may act alone as Substance I for the swelling of polymer particles.

After homogenisation the emulsion was charged with a seed latex of monodisperse polybutyl acrylate having a particle diameter of 0.3 μm (determined by electron microscopy). There were used 60.5 ml of seed latex containing 55.5 ml of H$_2$O and 5 ml of polymer particles. Then 10.5 ml of acetone were added under ordinary stirring at 30° C. After stirring for 3 hours at 30° C. acetone was removed by evaporation under vacuum.

After the evaporation of acetone 894.5 ml of H$_2$O were added to provide a total of 1000 ml of H$_2$O. Further, 200 ml of distilled styrene were added under ordinary stirring at 30° C. After stirring for 2 hours at 30° C. the temperature was raised to 60° C., and polymerisation was carried out to complete conversion. A monodisperse latex was formed having a particle diameter of about 1 μm.

EXAMPLE 15

20 ml of H$_2$O, 6 ml of Perkadox SE-8 (dioctanoyl peroxide) and 0.2 g of Na-laurylsulphate were homogenized as described in example 1. To this emulsion was added a seed latex of monodisperse polystyrene prepared as described in example 7, having a particle diameter of 1.7 μm (determined by electron microscopy). 41 ml of seed latex were used containing 35 ml of H$_2$O and 6 ml of polystyrene particles. In addition, 6 ml of acetone were added under ordinary stirring at 25°-30° C. After stirring for 14 hours at 25°-30° C. acetone was removed by evaporation under vacuum.

After evaporation of acetone 1.5 g of NaLS, 1.0 g of Berol 267 (nonyl phenol ethoxylate containing 8 moles of ethylene oxide per mole of nonyl phenol) and 945 ml of H$_2$O were added to provide a total of 1000 ml of H$_2$O. Then 200 ml of distilled styrene were added under ordinary stirring at 25°-30° C. After stirring for 3 hours at 25°-30° C. the temperature was raised to 70° C., and polymersation was carried out to complete conversion. The final latex was monodisperse and contained particles having a diameter of about 5 μm.

EXAMPLE 16

35 ml of H$_2$O, 4 ml of Perkadox SE-8 (dioctanoyl peroxide), 3 ml of chlorododecane and 0.2 g of Na-laurylsulphate were homogenized as described in example 1. To this emulsion was added a seed latex of monodisperse polystyrene prepared as described in example 7 having a particle diameter of 2 μm (determined by electron microscopy). 28.5 ml of seed latex were employed containing 25 ml of H$_2$O + 3.5 ml of polystyrene particles. In addition 10 ml of H$_2$O and 7 ml of acetone were added under ordinary stirring at 25°-30° C. After stirring for 14 hours at 25°-30° C. acetone was removed by evaporation under vacuum.

After the evaporation of acetone 1.2 g of NaLS, 1.0 g of Berol 267 and 930 ml of H$_2$O were added to provide a total of 1000 ml of H$_2$O. Then 175 ml of distilled styrene were added under ordinary stirring at 25°-30° C. After stirring for 3 hours at 25°-30° C. the temperature was raised to 70° C., and polymerisation was carried out to complete conversion. The final latex was monodisperse and contained particles having a diameter of about 7 μm.

EXAMPLE 17

20 ml of H$_2$O, 6 ml of Perkadox SE-8 (dioctanoyl peroxide) and 0.2 g of Na-laurylsulphate were homogenized as described in example 1. To this emulsion was added a seed latex of monodisperse polystyrene having a particle diameter of 1.7 μm (determined by electron microscopy) prepared as described in example 7. 41 of seed latex were employed containing 35 ml of H$_2$O and 6 ml of polystyrene particles. In addition 6 ml of acetone were added under ordinary stirring at 25°-30° C. After stirring for 14 hours at 25°-30° C. acetone was removed by evaporation under vacuum.

After evaporation of acetone 1.5 g of Na-laurylsulphate and 945 ml of H$_2$O were added to provide a total of 1000 ml of H$_2$O. Then 70 ml of distilled styrene were added under ordinary stirring at 25°-30° C. After stirring for 30 min. at 25°-30° C. the temperature was raised to 70° C. After polymerisation for 2 hours at 70° C. the addition of the remaining amount of monomer was started, and 140 ml of distilled styrene were added in the course of 5 hours. The temperature in the reactor was 70° C. during the addition of styrene. Polymerisation was carried out to complete conversion, and the final latex contained particles having a diameter of about 5 μm with standard deviation of about 0.5 μm.

In this example only some of the monomer was added at the beginning of the second step, while the rest of the monomer was added after the polymerisation has proceeded for some time.

EXAMPLE 18

30 ml of $H_2O$, 6 ml of stearyl methacrylate and 0.2 g of Na-laurylsulphate were homogenized as described in example 1. The temperature was kept at about 35° C. during the homogenisation. To the emulsion was added a co-polymer latex of styrene and butyl acrylate having a particle diameter of about 0.35 $\mu$m (determined by electron microscopy) and a glass transition temperature of about 15° C. 36 ml of latex containing 30 ml of $H_2O$ and 6 ml of polymer particles were used. In addition 6 ml of acetone were added under ordinary stirring at about 35° C. After stirring for 5 hours at about 35° C. acetone was removed by evaporation under vacuum.

After evaporation of acetone 2.5 g of Na-laurylsulphate and 940 ml of $H_2O$ were added to provide a total of 1000 ml of $H_2O$. Then 210 ml of styrene were added during ordinary stirring at about 35° C. After stirring for 2 hours at about 35° C. 4 g of AIBN dissolved in a small amount of 1,2-dichloroethane were added. After stirring for 1 hour at about 35° C. the temperature was raised to 70° C. and polymerisation was carried out to complete conversion. The final latex contained particles having a diameter of about 1 $\mu$m.

EXAMPLE 19

30 g of lauroyl peroxide (LPO) was dissolved in 30 g of styrene, and 30 g of 1-chlorododecane were added. Then 400 ml of $H_2O$ and 0.8 g of NaLS were added. The mixture was homogenized in a two stage homogenizer from Manton-Gaulin model 15-M, and the emulsion formed contained droplets having a diameter of 0.1–0.6 $\mu$m. The emulsion was transferred to a reactor at 60° C., and polymerisation was carried out to complete reaction. The latex formed contained particles having a diameter of 0.1–0.6 $\mu$m. To 82 g of the latex were added 933 ml of $H_2O$, 3.0 g of NaLS and 750 ml of chlorobenzene under ordinary stirring at 35° C. The amount of chlorobenzene added corresponds to 75–80 times the volume of the polymer particles. After stirring for 2 hours at 35° C. all chlorobenzene had diffused into the particles, and the emulsion formed contained droplets having a diameter of 0.5–2.5 $\mu$m.

EXAMPLE 20

Latex having a particle diameter of 0.1–0.6 $\mu$m was prepared as described in example 19. To 37 g of the latex formed were added 970 ml of $H_2O$, 6.0 g of NaLS and 800 ml of chlorobenzene under ordinary stirring at 35° C. In this example a higher concentration of emulsifier than in example 19 was used, and the amount of polymer particles relative to the amount of chlorobenzene could thereby be reduced. The amount of chlorobenzene used corresponds to about 180 times the volume of the polymer particles. After stirring for 2 hours at 35° C. all chlorobenzene had diffused into the particles, and the emulsion formed contained droplets having a diameter of 0.5–3.5 $\mu$m.

EXAMPLE 21

Latex having a particle diameter of 0.1–0.6 $\mu$m was prepared as described in example 19. To 82 g of the latex formed were added 933 ml of $H_2O$, 3.0 g of NaLS and 500 ml of styrene under ordinary stirring at 20° C. The amount of styrene added corresponds to approx. 50 times the volume of the polymer particles.

After stirring for 2 hours at 20° C. the temperature was raised to 80° C., and polymerisation was carried out until complete reaction by means of LPO present from the first step. The latex formed contained particles having a diameter of 0.5–2.0 $\mu$m, and the solids content was about 30 percent.

EXAMPLE 22

Latex having a particle size of 0.1–0.6 $\mu$m was prepared as described in example 19. To 111 g of the latex formed were added 910 ml of $H_2O$, 4.0 g of NaLS and 900 ml of vinyl chloride under ordinary stirring at 20° C. The amount of vinyl chloride added corresponds to 65–70 times the volume of the polymer particles. After stirring for 2 hours at 20° C. the temperature was raised to 50° C., and polymerisation was carried out to approx. 90 percent conversion by means of LPO present from the first step. The latex formed contained particles having a diameter of 0.5–2.0 $\mu$m, and the solids content was about 40 percent.

We claim:

1. A process for preparing an aqueous emulsion or dispersion of a partly water-soluble material which comprises:
   (a) preparing an emulsion or dispersion of particles comprising:
      (i) polymer and
      (ii) Substance I which is one or more materials having a molecular weight of $<5000$ and a water solubility of $<10^{-2}$ g/l and is substantially absorbed by said polymer and
   (b) adding to said emulsion or dispersion, Substance II which is one or more partly water-soluble materials having a water solubility at least 10 times higher than that of Substance I, whereby Substance II diffuses into the polymer particles containing Substance I at a rate substantially in excess of the rate of departure of Substance I from said polymer particles, the amount of said Substance II diffusing into said particles containing Substance I being at least 20 times that of the original polymer particles used in (a) based on volume, and then causing polymerization to take place if Substance II is a monomer.

2. The process according to claim 1, wherein Substance II is a polymerizable monomer.

3. The process according to claim 2 wherein the aqueous emulsion or dispersion of said polymerizable monomer is polymerized.

4. The process according to claim 1 wherein the solubility of said Substance I is $<10^{-4}$ g/l $H_2O$.

5. The process according to claim 1 wherein the solubility of said Substance I is $<10^{-5}$ g/l $H_2O$.

6. The process according to claim 3 wherein the solubility of said Substance I is $<10^{-5}$ g/l $H_2O$.

7. The process according to claim 1 wherein Substance I has a molecular weight of $<500$.

8. The process according to claim 3 wherein Substance I has a molecular weight of 21 500.

9. The process according to claim 6 wherein Substance I has a molecular weight of $<500$.

10. The process according to claim 1 wherein Substance I is added to a stirred aqueous dispersion of said polymer particles or to an aqueous dispersion of monomer or monomer mixture from which said polymer particles are prepared, whereby Substance I is transported through the aqueous phase to said particles which are swelled therewith, under conditions which cause the rate of transport of Substance I through the aqueous phase to be relatively high and then adding Substance II under stirring after causing said rate of transport of Substance I through the aqueous phase to become relatively low, whereby Substance II diffuses into the polymer particles swelled with Substance I.

11. The process according to claim 10 wherein Substance I is added in the form of an aqueous emulsion.

12. The process according to claims 10 or 11 wherein in order to increase the rate of transport in step (a) there is used an emulsifier in an amount such that the concentration of the emulsifier is above the critical micelle concentration, whereby some or all of Substance I is solubilized in micelles and wherein this effect is removed before the addition of Substance II in step (b), by the addition of water.

13. The process according to claims 10 or 11 wherein step (a) is performed in the presence of a solvent which is wholly or partly soluble in water and is a solvent for Substance I.

14. The process according to claim 12 wherein step (a) is performed in the presence of a solvent which is wholly or partly soluble in water and is a solvent for Substance I.

15. Process according to claim 13, wherein said solvent is acetone or a lower alkanol.

16. Process according to claim 13, wherein said solvent is a relatively water-soluble monomer.

17. The process according to claim 13 wherein said solvent is employed in an amount of 1-100% of the amount of water, based on volume, in step (a).

18. The process according to claim 14 wherein said solvent is employed in an amount of 1-100% of the amount of water, based on volume, in step (a).

19. The process according to claim 15 wherein said solvent is employed in an amount of 1-100% of the amount of water, based on volume, in step (a).

20. The process according to claim 13 wherein solvent is removed after step (a).

21. The process according to claim 20 wherein said solvent removal is by evaporation.

22. The process according to claim 10 wherein Substance II is a polymerizable monomer and wherein the emulsion or dispersion of said polymerizable monomer is polymerized.

23. The process according to claim 1 wherein after step (a), the amount of water in said emulsion or dispersion is increased, emulsifier is or is not added, and then Substance II is added with or without stirring.

24. The process according to claim 3 wherein a water soluble or partly water soluble initiator is added in step (b).

25. The process according to claim 24 wherein said initiator is added in the form of a solution.

26. The process according to claim 3 wherein in step (a) an initiator having very low solubility in water is added as a solution in Substance I.

27. The process according to claim 3 wherein there is employed a Substance I a liquid initiator for said polymerization.

28. The process according to claim 27 wherein the liquid initiator is dioctanoyl peroxide.

29. The process according to claim 1 wherein the dispersion of step (a) is prepared by first homogenizing a mixture of a polymerizable monomer and Substance I with or without an oil soluble initiator, water and emulsifier, then, with or without adding a wholly or partly water-soluble initiator, polymerizing to provide a dispersion of polymer particles containing 5-90 percent by volume of Substance I and then subjecting the resultant dispersion to step (b).

30. The process according to claim 29 wherein Substance II is a vinyl monomer which is polymerized after having been diffused into the particles prepared in step (a).

31. The process according to claim 1 wherein Substance I is absorbed by said polymer in an amount of 0.5 to 5 times the amount of polymer in the particles, based on volume.

32. The process according to claim 1 wherein Substance I is absorbed by said polymer in an amount of 1 to 4 times the amount of polymer in the particles, based on volume.

* * * * *